June 10, 1969  N. L. ROSIN  3,448,840
ENERGY ABSORBING NO-BACK DRIVE MECHANISM
Filed July 17, 1967  Sheet 1 of 2
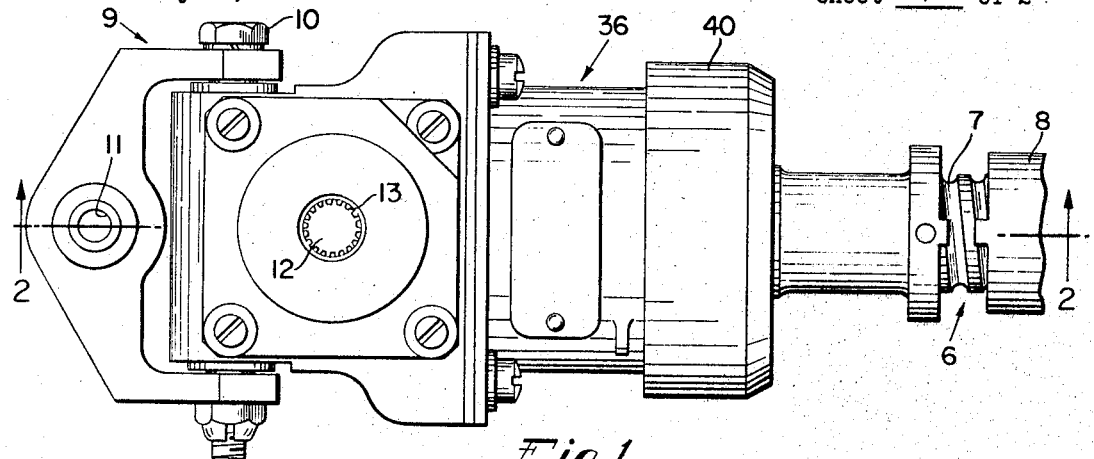
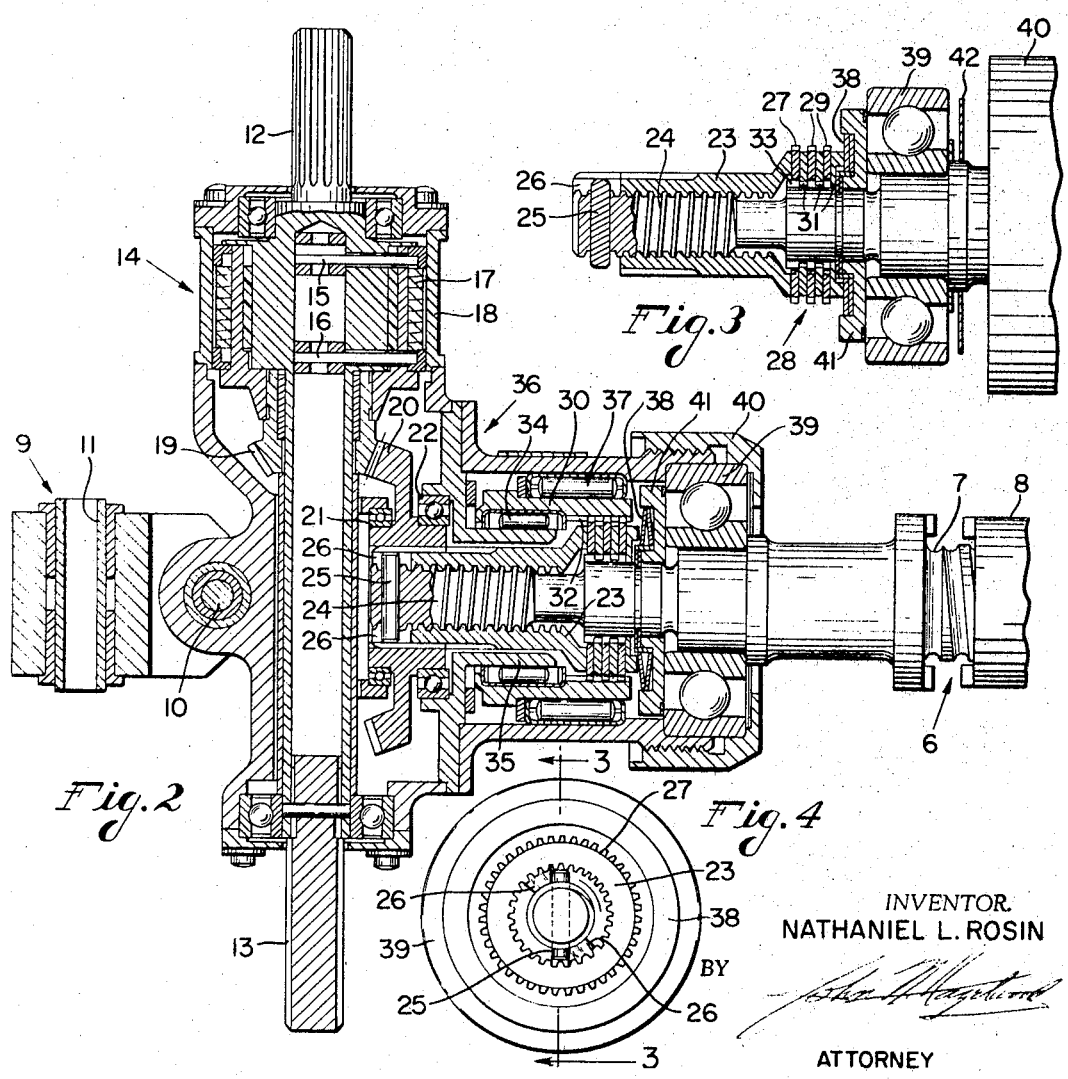
INVENTOR.
NATHANIEL L. ROSIN
ATTORNEY June 10, 1969　　　　　　　　N. L. ROSIN　　　　　　　　3,448,840
ENERGY ABSORBING NO-BACK DRIVE MECHANISM
Filed July 17, 1967　　　　　　　　　　　　　　　　Sheet 2 of 2
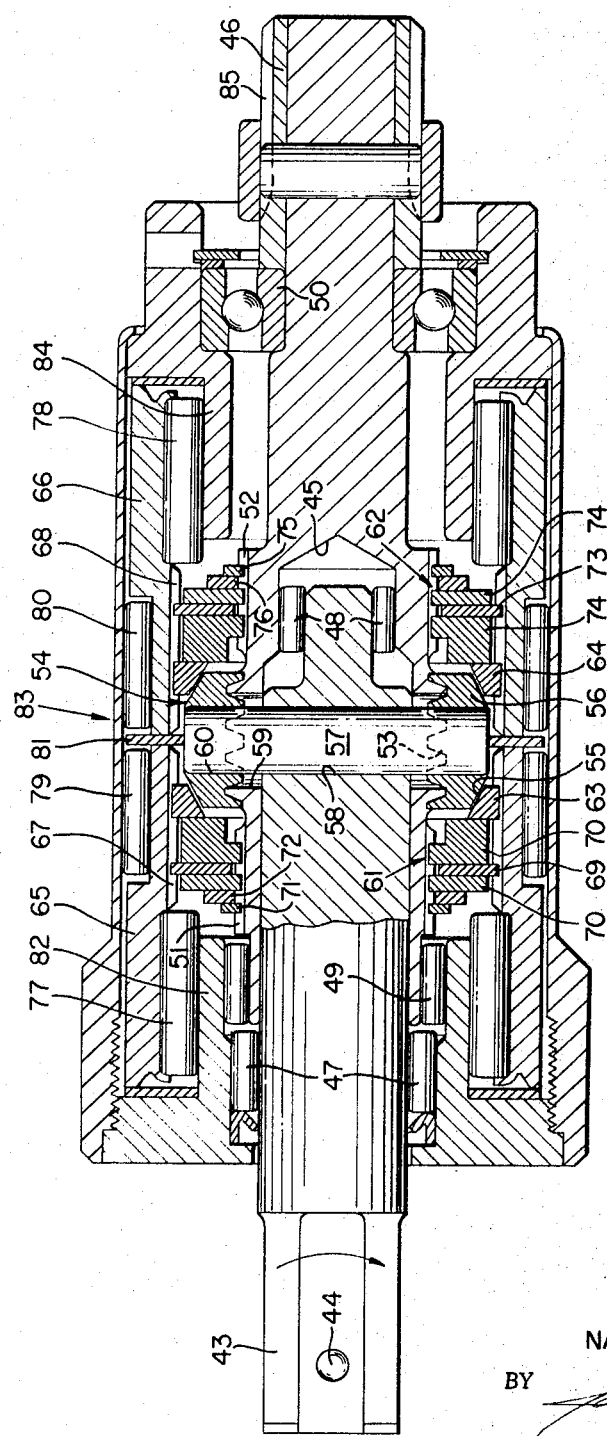
INVENTOR.
NATHANIEL L. ROSIN
BY
ATTORNEY United States Patent Office 3,448,840
Patented June 10, 1969

3,448,840
ENERGY ABSORBING NO-BACK DRIVE
MECHANISM
Nathaniel L. Rosin, Torrance, Calif., assignor to The
Garrett Corporation, Los Angeles, Calif., a corporation of California
Filed July 17, 1967, Ser. No. 653,896
Int. Cl. F16d 67/00, 57/10, 67/02
U.S. Cl. 192—8                                    9 Claims

ABSTRACT OF THE DISCLOSURE

A mechanism for transmitting torque from one shaft to another employing load responsive clutch means and unidirectional or no-back locking mechanism to minimize oscillation and chatter from the feed-back torque of a load.

The invention pertains in general to power delivery and more particularly to a control mechanism therefor employing clutching means operable responsive to the feed-back energy of a load to dissipate the energy thereof without inducing load iscillation or chatter.

A frequent problem in the handling of loads, particularly where they are aiding or acting in the direction of desired movement, is oscillation or chatter caused by feed-back energy from the load. This situation is encountered in diverse applications, e.g., in the drive of the air foil surface of an aircraft; the lowering of loads or the positioning of heavy machinery where positional or environmental conditions may impose loadings both of an aiding and of an opposing character, frequently changing quickly from one to the other. Existing devices frequently employ a single unit for the locking means for the lowering means and as a result require appreciable torque for unlocking the unit once lock-up has occurred. Typically, such units rely upon the interaction of a ramp with ball, roller or detent means. With the unitary arrangement for locking and lowering the spragues or rollers which lock the unit must also dissipate the energy, giving rise to severe oscillations.

In contrast with such existing devices, this invention employs a clutch actuating member whose travel axially of the coupled members responsive to their relative rotation effects clutching or de-clutching through application of a clutching pressure to the clutch plates. When fully locked, the clutch may serve to shunt the feed-back energy from the airing load to stationary structure through uni-directional locking means, but may also serve to provide varying restraint to an aiding load as by controlled plate slippage and energy dissipation. Absent is the continuous locking and unlocking action characteristic of existing devices when handling aiding loads which results in undesirable oscillations or chatter which have a tendency to progressively increase with unit operation. Accordingly, this invention provides a relatively simple, reliable and inexpensive means of relatively low weight and limited volume for achieving the aforementioned load handling capabilities.

The features and advantages of this invention will become further apparent from the following description and drawings in which:

FIG. 1 is a view in side elevation of an embodiment of the invention;

FIG. 2 is a view in longitudinal section taken on the line 2—2 of FIG. 1 with the clutch assembly in unlocked position;

FIG. 3 is a view in longitudinal section of the clutch assembly in locked position and is taken on line 3—3 of FIG. 4;

FIG. 4 is a view in end elevation of the clutch assembly; and

FIG. 5 is a view in longitudinal section of another embodiment of the invention.

The invention as shown in FIGS. 1, 2, and 3 is embodied in a flap actuator drive employing a jackscrew 6 with raceways 7, the traveling nut 8 being secured to a flap out of view to the right. A trunnion joint 9 is provided to permit universal movement of the entire jackscrew assembly with bolt 10 permitting rotation in one plane and a clevice (not shown) secured to stationary structure (not shown) received within sleeve 11 permitting rotation in an orthogonal plane.

Drive is through splined input shaft 12 which may, in a typical aircraft application be via torque tubes (not shown) and extend through splined output shaft 13 to another similar flap actuating unit. Although forming no part of this invention, there is shown in the upper portion of FIG. 2, a double-acting or dual-directional, torque-limiting assembly 14 serving through pins 15 and 16 and self-energizing capstan spring 17 to prevent application of excessive torque to the actuator assembly in the event of locking or jamming of the jackscrew 6. With such occurrence, power is shunted to ground by engagement of the capstan spring 17 with the interior surface of enveloping housing 18.

The torque applied through the input shaft 12 is transmitted through the above-described torque limiting assembly 14 into beveled gear pinion 19 splined to output shaft 13 and thence to another jack (not shown). From the pinion gear 19 the torque is transmitted to bevel gear 20, the latter mounted in bearings 21 and 22. Bevel gear 20 is splined to acme nut or clutch actuating member 23 to impart torque thereto, while the acme nut is at the same time permitted longitudinal movement toward or away from the bevel gear.

The acme nut 23 threadedly engages jackscrew shaft 6 at its reduced threaded left extremity 24 to move axially thereof with relative rotation of the nut and shaft into and out of a clutch actuating or pressure applying position. The travel of acme nut 23 in either direction is limited through the action of pin 25 which extends through the threaded left extremity 24 of shaft 6 to abut projecting ears 26, as best shown in FIGURE 4.

In the clutch actuating position, shown in FIG. 3, the acme nut 23 is in tight abutment with the left-hand or dead plate 27 of the fritcion clutch assembly 28. This assembly is made up of a plurality of annular friction plates 29 which, with dead plate 27, are externally splined to a clutch-engaging, cylindrical barrel member 30 and to annular friction plates 31, which latter are internally splined to jackscrew shaft 6. The clutch plates 27, 29, and 31 are permitted movement axially of shaft 6 but are held against movement circumferentially of their respective locking members by annularly positioned splines 32 and 33. It is important, for reasons presently explained, that the left-hand plate 27 be a dead plate, i.e., be externally splined or locked against rotation relative to the barrel member 30 and not splined to the jackscrew shaft 6. Barrel member 30 is permitted rotation in but one direction by an annular no-back locking member 34 which locks the barrel member to stationary sleeve 35 and to housing 36 when rotation in an opposite direction is attempted. Bearing 37, together with rollers of no-back locking member 34, serves to carry barrel member 30 in its permitted direction of rotation.

In FIG. 2 the acme nut 23 is positioned near the left end of shaft left extremity 24 or in a clutch relieving position with the clutch plates 27, 29 and 31 in loose abutment. In FIG. 3 the acme nut 23 is at the right-hand travel extremity or clutching position, driven thereto by application of a clockwise torque (viewed from the left) to the bevel gear 20 through rotating of meshing pinion gear 19. In this position the acme nut 23 is applying full pressure to the clutch plates and compressing the Belleville spring 38, which latter serves as a self-energizing means for acme nut 23 through the dead plate 27 of clutch assembly 28. By providing a dead plate at the point of contact with the acme nut 23, the torque reaction at such contact point is effectively transmitted to the cluch plates to effect their tight inter-engagement and locking. The clutch assembly is thus so designed as to be self-energizing when feedback torque produced by an aiding load is applied.

When bevel gear 20 is driven in a clockwise direction of rotation (as viewed from the left) against an opposing load—here the extension of an aircraft flap (not shown) operably connected to a jacknut 8—the flap as thus loaded acts to apply a shaft torque in the opposite or counterclockwise rotation. The acme nut 23 is urged to the right by the relative rotation of the nut and shaft 6 into abutment with the clutch dead plate 27, imparting a pressure to the clutch plates and a locking of the clutch assembly 28. Assuming the no-back locking member 34 permits unidirectional rotation of barrel member 30, only in the clockwise direction, the no-back locking member will be freewheeling in this condition and torque will be transmitted to the jackscrew shaft 6 through the clutch assembly 28, the acme nut 23, and the threaded left extremity 24 of the jackscrew shaft 6. The jackscrew shaft is carried in its rotation by bearing 39 which is secured within housing 36 by means of a threaded cap nut 40, intermediate annular ring member 41, and spacer ring 42.

Assuming the flap is now to be retracted by counterclockwise rotation of bevel gear 20, and in so doing imparts an aiding counterclockwise torque or load via jacknut 8 and shaft 6, the relative rotation of the shaft 6 and acme nut 23 is the same as in the condition immediately preceding. Hence, the clutch plates of clutch assembly 28 are locked by the action of the acme nut 23; and the no-back locking member 34 is in this instance locked to ground. If the bevel gear 20 is rotated at a greater velocity than the jackscrew 6, the resultant relative rotation causes acme nut 23 to move to the left, tending to unlock the clutch plates and permitting their slippage. As a result, the jackscrew shaft 6 is permitted to rotate counterclockwise even though the barrel member 30 and the plates 27 and 29 splined thereto are held against counterclockwise rotation by no-back locking member 34.

Where there is no load upon the jackscrew shaft 6 upon flap retraction through counterclockwise shaft rotation, the acme nut is moved to the left relieving the pressure upon the clutch plates to a limiting position where its diametrically opposed ears 26 abut opposite ends of pin 25, with driving thence accomplished through the pin.

The invention embodiment of FIG. 5 is adapted to handle aiding and opposing loads in both directions. As therein shown, the left-hand shaft 43 is provided with a squared left end and a spring-loaded, retaining detent 44 for receipt of a driving crank or handle (not shown). The shaft at right end is of reduced cross section for receipt within the stepped recess 45 of the right-hand shatf 46. Shaft 43 is carried for rotation in bearings 47 and 48, and shaft 46, in bearings 49 and 50. Shaft 46 is provided at its left end portion with annularly positioned splines 51 and 52 which are disposed astraddle of of acme threads 53—all integral with the shaft. An annular acme nut 54 provided with beveled shoulders 55 and 56 engages threads 53 for movement to the right or left of the central or neutral position of FIG. 5, alternatively pressurizing one set of clutch plates and relieving the other. In the neutral position of FIG. 5 the acme nut 54 permits substantially free movement of the clutch plates. As is indicated, the acme nut travels but a short distance in accomplishing the pressurizing of one or the other sets of clutch plates. It is assumed that the acme nut 54 mating with threads 53 causes the nut to move to the right with clockwise rotation of shaft 43 relative to shaft 46. A pin 57 extends through shafts 43 and 46 and the acme nut, the pin being received within aligned bores 58 and 59 of shafts 43 and 46 and aligned bore 60 in acme nut 54. Bore 59 is enlarged and of generally prolate shape to permit limited relative rotation between shafts 43 and 46; however the acme nut and shaft 43 are locked by pin 57 for unitary rotation.

Like the acme nut in the prior described invention embodiment, acme nut 54 serves a clutch locking function, here applying pressure either to left-hand clutch assembly 61 or to right-hand clutch assembly 62 through travel back and forth on threads 53. Contact of the nut with the clutch assemblies is through its beveled shoulders 55 or 56 with the adjoining annular dead plate 63 or 64 of the respective assemblies. Each of the plates 63 and 64 is internally beveled for abutment with the shoulders of acme nut 54 and externally locked against rotation relative to clutch-engaging, cylindrical barrel members 65 and 66 by annularly positioned splines 67 and 68. It should be noted that the crank or handle (not shown), heretofore indicated as received upon shaft 43, serves a clutch energizing function. Although not so shown, the spacer ring 81 could be a drag inducing or self-energizing means serving to hold acme nut 54 stationary with regard to the housing 83 so that when an aiding load were applied by the output shaft 46, the drag inducing means would tend to move the acme nut axially into engagement with either of the dead plates 63 or 64.

In addition to dead plate 63, the left-hand clutch assembly 61 is comprised of annular clutch plate 69 which, like dead plate 63, is externally locked against rotation relative to barrel member 65 by spline 67. Positioned alternately of plate 63 and 69 for friction engagement therewith, are annular clutch plates 70 which are locked against rotation relative to the shaft 46 by the splines 51. As with the first invention embodiment, the splining of the clutch plates permits their travel axially, but not rorotatably, of the respective restraining splined members. A snap ring 71 received in a mating recess in shaft 43 and an intermediate shim ring 72 are provided to limit the extent of clutch plate axial movement to the left. The right-hand clutch assembly 62 is similar to the clutch assembly 61 being comprised, in addition to the annular dead plate 64, of annular clutch plate 73 which is externally locked against rotation relative to barrel member 66 by spline 68. Positioned alternately of the plates 64 and 73 for friction engagement therewith are annular clutch plates 74, which are locked against rotation relative to the shaft 46 by annularly positioned splines 52. Snap ring 75, received within a mating recess in shaft 46 and shim ring 76 limit the extent of clutch plate axial movement to the right.

As with the barrel member employed in the embodiment of FIGURES 1 through 4, annular, no-back or unidirectional locking members 77 and 78 are provided for each of the barrel members 65 and 66, which latter are spaced apart by ring 81 and respectively carried for rotation in bearings 79 and 80. The no-back assemblies 77 and 78 are similar and permit only uni-directional rotation of the barrel member with which each is associated. When viewed from the left, no-back member 77 permits rotation of barrel member 65 in a counterclockwise direction. When rotation in the opposite or clockwise direction is attempted, the barrel member is locked to stationary sleeve member 82 which in turn is secured to housing 83. When similarly viewed from the left, no-back locking member 78 permits rotation of its associated barrel member 66 in a clockwise direction of rotation, with the barrel member being locked against counterclockwise rotation by stationary sleeve member 84 which in turn is secured to housing 83.

Assume now an input torque in clockwise direction is applied to shaft 43 and an aiding load (not shown) is carried by shaft 46 via splines 85 thereby providing an aiding or clockwise torque. Assume further that the load is one which will, when driven a certain distance in a clockwise direction, move past a center or neutral position to reverse its action, applying an opposing or counterclockwise torque to shaft 46. The clockwise torque resulting from the aiding load causes the acme nut to move to the left, its beveled shoulder 55 tightly abutting dead plate 63, thereby causing plates 69 and 70 of left-hand clutch assembly 61 to lock. In this situation, the no-back locking member 77 prevents counterclockwise rotation of barrel member 65 and of shafts 43 and 46 interlocked thereto through action of the locked clutch plates. No-back member 77, of course, permits a clockwise rotation of the input shaft 43 though the locked clutch plates. With movement of the acme nut 54 to the left, the right-hand clutch assembly 62 is in an unlocked mode, with plates 64, 73 and 74 relieved, and permits both clockwise and counterclockwise rotation of shaft 46, notwithstanding the unidirectional lock of barrel member 66 provided by no-back locking member 78. In order to permit the aiding load to drive, an input torque is applied to shaft 43 in a clockwise direction, which moves the acme nut 54 to the right, relieving the plates of the left-hand clutch assembly 61 from their locked condition to permit plate slippage.

As the load is driven beyond the central or neutral position mentioned above, a torque in a counterclockwise or opposing direction is applied to shaft 46 which causes the acme nut to move to the right, at which time the plates of left-hand clutch assembly 61 are relieved to permit plate slippage. The plates of right-hand clutch assembly 62 are locked and the unidirectional locking member or no-back 78 is in its freewheeling mode, allowing the transmission of torque through to shaft 46.

Assume now the application to the shaft 43 of an input torque in a counterclockwise direction with an aiding load (not shown) carried by shaft 46. The resultant torque imposed by the load causes the acme nut 54 to move to the right, thereby locking the plates of right-hand clutch assembly 62. The right-hand no-back locking member 78 is in its locked mode. The left-hand clutch assembly 61 is in a relieved condition and left-hand no-back 77 in a freewheeling mode. By applying an input torque to shaft 43 in a counterclockwise direction, the acme nut is urged to the left to relieve the load on the clutch plates of the right-hand clutch assembly 62 allowing same to slip. This, of course, assumes that the rotational velocity of the shaft 43 is slightly greater than that created by the aiding load.

With movement of the load through the neutral position, an opposing torque acting in a clockwise direction is applied to the shaft 46. This opposing torque causes acme nut 54 to move to the left. The clutch plates of the left-hand clutch assembly 61 are thereby locked and the no-back locking member 77 is free to rotate in a counterclockwise direction. In this mode, the plates of the clutch assembly 62 are, of course, relieved and slipping and the the no-back 78 is in its locked mode. However, the shaft 46 is permitted to turn by virtue of the fact of the plate slippage permitted by the relief of the plates in the clutch assembly 62.

I claim:

1. In a drive mechanism; the combination comprising:
a housing;
a first torque transmitting member and a second torque transmitting member, each positioned for rotation in the housing;
a unidirectional locking means positioned in and secured to the housing;
a clutch engaging member positioned for rotation with- in the housing operably connected with the unidirectional locking means;
clutch means relievably interconnecting the first and second torque transmitting members with the clutch engaging member;
a clutch actuating member operable responsive to relative rotation between the first and the second torque transmitting members to move the clutch means progressively into or out of a fully locked position, thereby permitting independent rotation of the first and second torque transmitting members in either direction when the clutch means is not fully locked while at the same time offering variable restraint and energy dissipation upon relative rotation of said torque transmitting members, and whereby locking against rotation in one direction by the torque transmitting members is provided with full locking of the clutch means through the clutch engaging member and the uni-directional locking member operably connected thereto;
said first torque transmitting member being secured for rotation with said clutch actuating member which is disposed to move longitudinally of said second torque transmitting member in effecting said progressive movement of the clutch means; and
said clutch means including a plurality of friction plates connected either to said second torque transmitting member or said clutch engaging member, said plates each being permitted longitudinal movement responsive to the clutch-movement effected by the clutch actuating member but being locked against rotation relative to the second torque transmitting member or clutch engaging member to which said plates are respectively connected.

2. The combination of claim 1, wherein self-energizing means are provided to initiate said movement of the clutch means by the clutch actuating member.

3. The combination of claim 1, wherein the clutch actuating member is threadedly interconnected with the second torque transmitting member.

4. The combination of claim 3, wherein means are provided to limit the extent of travel of the clutch actuating member relative to the second torque transmitting member.

5. In a drive mechanism, the combination comprising:
a housing;
a first torque transmitting member and a second torque transmitting member, each positioned for rotation in the housing;
a uni-directional locking means positioned in and secured to the housing in coaxial relationship with said second torque transmitting member;
a clutch engaging barrel member carried by the uni-directional locking means for rotation in one direction and locking to the housing against rotation in the other;
clutch means relievably interconnecting the first and second torque transmitting members with the clutch engaging member through a plurality of annular friction clutch plates respectively secured either to the clutch engaging barrel member or the second torque transmitting member against rotation relative to the respective member to which said plates are secured but said plates being permitted to move longitudinally of the securing member;
and a clutch actuating member threadedly interconnected with the second torque transmitting member and driven in rotation by the first torque transmitting member for movement longitudinally of the second torque transmitting member so as to impart clutching pressure to the clutch means responsive to relative rotation between the torque transmitting members to move the plates of the clutch means progressively into or out of fully locked positions, whereby is permitted independent rotation of the first and second torque transmitting members in either direction when the clutch plates are not fully locked while at the same time there is afforded variable restraint and energy dissipation upon relative rotation of the torque transmitting members, and whereby locking of the torque transmitting members against rotation in one direction is provided with full locking of the clutch plates through the clutch engaging barrel member and the uni-directional locking means.

6. The combination of claim 5, wherein biasing means are provided to initiate said movement of the clutch means by imparting a self-energizing pressure to the clutch means and the clutch actuating member in pressure imparting relationship therewith.

7. The combination of claim 5, wherein means are provided to limit the extent of said movement of the clutch actuating member relative to the second torque transmitting member.

8. In a drive mechanism, the combination comprising:
a housing;
a first torque transmitting member disposed for rotation in the housing;
a second torque transmitting member disposed for rotation in the housing coaxially with the first torque transmitting member and having a threaded portion;
a first uni-directional locking means and a second unidirectional locking means, each positioned in and secured to the housing in coaxial relationship with the torque transmitting members,
first and second clutch engaging barrel members respectively carried by the uni-directional locking means for rotation in one direction and locking to the housing against rotation in the other;
first and second clutch means respectively relievably interconnecting the first and second torque transmitting members with the first and second clutch engaging barrel members through a plurality of annular friction clutch plates, the plates of the first clutch means being secured either to the clutch engaging first barrel member or the second torque transmitting member and the plates of the second clutch means being secured either to the clutch engaging second barrel member or the second torque transmitting member, the said clutch plates of the first and second clutch means being prevented rotation relative to their respective members to which said plates are secured but permitted movement longitudinally thereof; and
a clutch actuating member operably connected to the first torque transmitting member and carried upon the threads of the second torque transmitting member for movement longitudinally thereof, the clutch actuating member being driven in rotation by the first torque transmitting member to move longitudinally of the second torque transmitting member to impart clutching pressure to the plates of one of the first and second clutch means responsive to relative rotation between the torque transmitting members, whereby the clutch actuating member is moved progressively into or out of a position fully locking the clutch plates of the respective one of first and second clutch means, thereby permitting independent rotation of the first and second torque transmitting members in either direction when either of the clutch means is not fully locked while at the same time offering variable restraint and enrgy dissipation upon relative rotation of the torque transmitting members and whereby the latter are locked against rotation in one direction when the clutch plates of the first or second clutch means are fully locked, but free to rotate in an opposite direction.

9. The combination of claim 8, wherein:
said clutch actuating member is a nut having beveled shoulders, and complementally shaped plates are provided in the first and second clutch means for abutment with either of said shoulders upon the imparting of said clutching pressure by the clutch actuating member.

References Cited

UNITED STATES PATENTS

| 877,714 | 1/1908 | Heermans. | |
| 1,833,224 | 11/1931 | Mullan et al. | 192—8 X |
| 2,197,819 | 4/1940 | Vickers | 192—8 X |
| 2,364,019 | 11/1944 | Beall | 192—8 X |
| 2,653,691 | 9/1953 | Weiland | 192—8 |
| 2,727,604 | 12/1955 | Robertson | 192—8 X |
| 2,969,222 | 1/1961 | Sears | 192—8 X |
| 3,039,420 | 6/1962 | Bevis et al. | |

FOREIGN PATENTS 809,423  12/1936  France.

BENJAMIN W. WYCHE III, *Primary Examiner.*

U.S. Cl. X.R.

188—134; 192—12; 193—36